United States Patent Office 3,044,931
Patented July 17, 1962

3,044,931
ARYLOXY ACETIC ACID AMIDES: PROCESS FOR PARENTERAL APPLICATION
Elvin A. Holstius, White Plains, N.Y., assignor to Geigy Chemical Corporation, Ardsley, N.Y., a corporation of Delaware
No Drawing. Filed Feb. 12, 1960, Ser. No. 8,221
Claims priority, application Switzerland Jan. 27, 1960
12 Claims. (Cl. 167—52)

The present invention concerns new anesthetic emulsions, the production thereof as well as their use.

Substituted phenoxyacetic acid dialkylamides of the general formula

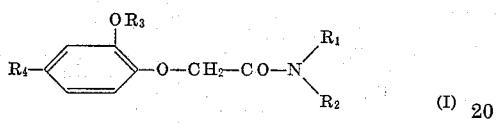

(I)

wherein $R_1$, $R_2$ and $R_3$ represent low molecular alkyl radicals, and $R_4$ represents a low molecular alkyl, alkenyl, α-oxoalkyl or α-hydroxyalkyl radical, have very strong anesthetic activity, which action begins very quickly after parenteral, in particular intravenous, application but which, however, is only of very short duration after one single application.

The amides of the general Formula I are generally neutral oils which are insoluble in water. Up to now they have been applied in the form of solutions in mixtures of water and the usual solubility promoters, for example, propylene glycol or sodium benzoate. However, it has been found that after intravenous injection of such solutions, damage in varying degree has been done to the veins, so that in spite of the excellent anesthetic action of eugenol glycolic acid diethylamide and the absence of the usual after-effects of anesthetics such as confusion and nausea, it has not been possible to introduce these solutions into therapeutics.

It has now surprisingly been found that anesthetic active ingredients of the above general Formula I can be dispersed in water to form stable emulsions with the aid of lecithin free of histamin and pyrogens. Lecithin is a crude mixture of compounds which may be more accurately designated as phosphatides or phospholipids. The phospholipids which make up commercial lecithin are essentially chemical lecithin, chemical cephalin and inositol phosphatides. Chemical lecithin is a glyceride which may be described as modified fat in which the fatty acid radicals are attached to glycerin and the third radical is made up of phosphoric acid linked with choline.

In the anesthetic active substances of the general Formula I, $R_1$, $R_2$ and $R_3$ can be, for example, methyl, ethyl, n-propyl, or n-butyl radicals, and $R_4$ the ethyl, n-propyl, n-butyl, allyl, propenyl, acetyl, propionyl, n-butyryl, isobutyryl, n-valeryl, α-hydroxyethyl, α-hydroxy-n-propyl, α-hydroxy-n-butyl or α-hydroxy-n-amyl radical.

An example of a commercial product useful according to the present invention is Gliddophil S.M. [a product of the former Glidden Company now known as Chemurgy Division of Central Soya Company, Chicago, Illinois, who manufacture and commercialize the same compound as Centrophil S.M.]. Centrophil S.M. is a non-toxic oil soluble phosphatide containing approximately

| | Percent by weight |
|---|---|
| Chemical lecithin | 60 |
| Chemical cephalin | 30 |
| Inositol phosphatides | 2.2 |
| Soya bean oil | 4.0 |
| Miscellaneous (inert carriers, etc.) | 3.8 |

More specifically this compound is an oil-in-water emulsifier having the following properties:

| Physical state | Acetone insolubles, percent | Maximum petroleum ether insolubles, percent | Maximum moisture, percent | Total acid values | Maximum color (lovibond) |
|---|---|---|---|---|---|
| soft plastic | 50-55 | 0.2 | 2.2 | 10-15 | 1.5 R, 10 Y |

A further useful product of the same manufacturer is Centrophil S.A., a purified soya phosphatide preparation stabilised with about 15% alcohol.

Advantageously these emulsions are made isotonic to human blood with the usual additives such as e.g. glucose, dextran or polyvinyl pyrrolidone.

Compared with emulsions prepared with other emulsifying agents, those produced according to the invention are distinguished by their excellent stability and lend themselves well to sterilisation by heat. The further addition of a minor portion of one or more auxiliary emulsifying agents, preferably from about 2 to about 10 weight percent of partial glycerides of higher fatty acids such as, e.g. mono- or di-olein and/or their polyoxyethylene derivatives such as, e.g. polyoxyethylenated palmito-stearin or di-olein has proved to be of particular advantage. Also, smaller amounts of other dispersing agents such as, e.g. polyoxyethylenated sorbitan monolaurate, which are used in a concentration of from about 0.01 to about 1%, preferably about 0.1%, have a favourable effect on the stability of the emulsions according to the invention.

In addition to having all the advantageous properties of the solutions already known, these emulsions, in contrast to solutions, do not damage the veins in any way and thus, for the first time, enable a valuable active ingredient to be used for parenteral administration in therapeutics. The emulsions according to the present invention are suitable, in particular, as anesthetics for short but painful interventions such as finger nail extractions, incisions of abscesses, reduction of dislocation, removal of bone nails and Küntscher nails after fracture and so forth. The adult initial dose of active ingredient of the Formula I is between about 250 and 500 milligrams. If desired after about 3–4 minutes, anesthesia can be maintained by further doses of 50–200 milligrams. Corresponding to the initial and maintenance doses necessary, suitable concentrations of active ingredient of the Formula I, e.g. eugenol glycolic acid diethylamide (2-methoxy-4-allyl phenoxy acetic acid diethylamide) are between 2% and 10% by weight, in particular 5%. The concentration of the emulsifier varies within about the same limits and, in the case of the preferred active ingredient concentration of 5% by weight, it is advantageously from about 3% to about 6% by weight, for example, 1.5–3% of soya lecithin preparation and 1.5–3% of auxiliary emulsifying agent. In addition, about 0.1 weight percent of other dispersants, e.g. polyoxyethylenated sorbitan monolaurate is useful.

The following examples illustrate the invention, but by no means limit it in any way. The temperatures are in degrees centigrade.

Example 1

150 grams of eugenol glycolic acid diethylamide (2-methoxy-4-allyl phenoxy acetic acid diethylamide) and 120 grams of Gliddophil S.M., as defined hereinabove, are mixed, the mixture is heated to 80° and the solution obtained is filtered through a sintered glass funnel. Also, 150 grams of glucose are dissolved in 2.5 liters of distilled water, the solution is also heated to 80° and then added slowly under intensive stirring to the mixture of active ingredient and emulsifier which is being kept at 80°. On completion of the addition, the emulsion is made up to 3.0 liters with distilled water, stirred for 15 minutes and then it is allowed to cool to 50°. At this temperature, it is passed under a pressure of 3,000 lbs. per square inch through a homogeniser, e.g. Hydropulse Homogeniser of the Pioneer Division, Scott and Williams, Laconia, N.H., Model No. 1-LB-75. The emulsion is then sterilised for 30 minutes at 120° in an autoclave and then filled into ampuls of, for example, 5 milliliters or 10 milliliters' capacity. Each ampul contains 250 milligrams or 500 milligrams of active ingredient respectively, i.e. the necessary amount for children's short anesthesia or for adults including the maintenance doses. The size of the particles in emulsions so prepared is about 0.5–1.5µ, the pH is about 4.16, and depression of the freezing point is −0.57°.

The Gliddophil S.M. may be replaced, if desired, by any other non-toxic, physiologically acceptable lecithin consisting essentially of chemical lecithin (in predominating amounts), chemical cephalin and a minor portion, preferably from about 0.0001 to 10 weight percent of inositol phosphatides, oils, e.g. soya bean oil, etc.

*Example 2*

100 parts of 2-methoxy-4-allyl phenoxy acetic acid diethylamide and 47 parts of Centrophil S.A. (purified lecithin preparation stabilised with 15% alcohol), corresponding to 40 parts of phosphatides, are mixed with 40 parts of mono-olein and the whole is heated to 75–80°. Also, 100 parts of glucose are dissolved in about 1600 parts of water, the solution is also heated to 75–80° and, while quickly and intensively stirring, this solution is added to the mixture of active substance, lecithin and emulsifier which has been kept at 75–80°. As soon as a homogeneous dispersion has been obtained after some time, it is cooled to room temperature, brought up to 2,000 parts with distilled water and filtered through a sintered glass funnel. The filtered emulsion is again heated to 75–80°, the desired degree of dispersion is attained by passing it through a suitable homogeniser, the emulsion is filled into suitably sized ampoules, e.g. 5 ml. or 10 ml., and these are sterilised for 30 minutes at 120°.

Instead of 40 parts of mono-olein, also 40 parts of di-olein or 40 parts of polyoxyethylenated olein or 40 parts of polyoxyethylenated palmitostearin is used.

*Example 3*

100 parts of 2-methoxy-4-allyl phenoxy acetic acid diethylamide, 47 parts of Centrophil S.A. (corresponding to 40 parts of phosphatides), 20 parts of polyoxyethylenated palmitostearin, 20 parts of diolein and 100 parts of glucose are mixed and the mixture is heated to 60–65°. About 1600 parts of 75–80° warm water are added while quickly and intensively stirring to the mixture of active substance, lecithin and emulsifiers and the hole is stirred until a homogeneous mixture is obtained which, after cooling to room temperature, is made up to 2000 parts with distilled water. After filtering through a sintered glass funnel, this emulsion is heated to 75–80° and homogenised until the desired degree of dispersion is attained. The emulsion is then filled into suitably sized ampoules and sterilised.

This emulsion is produced in the same manner by also using 2 parts of polyoxyethylenated sorbitan monolaurate ("Tween 20").

*Example 4*

100 parts of 2-methoxy-4-allyl phenoxy acetic acid diethylamide, 40 parts of lecithin having a low content of inositol phosphatides (produced from soya lecithin by dissolving in petroleum ether, precipitating the total phosphatides by means of acetone, dissolving in chloroform and precipitating the inositol phosphatides by means of alcohol), 40 parts of polyoxyethylenated olein and 2 parts of polyoxyethylenated sorbitan monolaurate are mixed and heated to 75–80°. Also a solution of 100 parts of glucose in 1600 parts of water is heated to 75–80°. While strongly and intensively stirring, the glucose solution is slowly poured into the mixture of active substance and emulsifying agents and the whole is stirred until a homogeneous dispersion is obtained. The emulsion, cooled to room temperature, is made up to 2000 parts with distilled water, filtered through a sintered glass funnel and heated to 75–80° whereupon it is homogenised in a suitable homogeniser until the desired degree of dispersion is obtained. The emulsion is then filled into suitably sized ampoules and these are sterilised for 30 minutes at 120°.

*Example 5*

100 parts of 2-methoxy-4-n-propyl phenoxy acetic acid diethylamide, 40 parts of a lecithin having a low content of inositol phosphatides, produced from soya lecithin according to Example 4, 20 parts of diolein and 20 parts of polyoxyethylenated olein are mixed and the solution is heated to 75–80° whereupon it is further worked up as described in Example 4 with a solution of 100 parts of glucose in 1600 parts of water.

*Example 6*

25 parts of a solution of 80% soya phosphatides and 20% alcohol, obtained from soya lecithin by dissolving it in petroleum ether and precipitating the total phosphatides with acetone and then removing the inositol phosphatides analogously to Example 4, are dispersed while stirring strongly in a solution of 50 parts of glucose in about 800 parts of distilled water, the temperature of the mixture rising to about 85° because of the stirring. While still stirring, 20 parts of mono- or di-olein and then 50 parts of 2-methoxy-4-allyl phenoxy acetic acid diethylamide are added and the whole is stirred until a homogeneous emulsion of the desired degree of dispersion is obtained. The emulsion is cooled to 20°, made up to 1000 parts with distilled water and filtered through a sintered glass funnel whereupon it can be filled into suitably sized ampoules which are sterilised according to Example 4.

2-ethoxy-4-allyl phenoxy acetic acid diethylamide, 2-methoxy-4-propenyl phenoxy acetic acid diethylamide, 2-methoxy-4-allyl phenoxy acetic acid di-n-propylamide, 2-ethoxy-4-allyl phenoxy acetic acid di-n-propylamide, 2-methoxy-4-n-propyl phenoxy acetic acid diethylamide, 2-ethoxy-4-n-propyl phenoxy acetic acid diethylamide, 2-methoxy-4-n-butyryl phenoxy acetic acid diethylamide, 2-ethoxy-4-n-butyryl phenoxy acetic acid diethylamide, 2-methoxy-4-(α-hydroxy-n-butyl)-phenoxy acetic acid diethylamide and 2-methoxy-4-(α-hydroxy-n-amyl)-phenoxy acetic acid diethylamide are also used equally well in the above examples as anesthetic active ingredients.

The temperature of 75–80° given in the above examples is not the minimal temperature as the emulsions described can be produced equally well also at lower temperatures. The order in which the ingredients are added can also be changed.

The present application is a continuation-in-part of co-pending application, Serial No. 792,259, filed February 10, 1959, and abandoned since the filing of the present application.

What is claimed is:

1. An anesthetic aqueous emulsion for intravenous application characterised by a content of 2–10% by weight of compound of the general formula $$R_4-\underset{OR_3}{\underset{|}{C_6H_3}}-O-CH_2-CO-N\underset{R_2}{\overset{R_1}{<}}$$

wherein $R_1$, $R_2$ and $R_3$ are low molecular alkyl radicals and $R_4$ is a member selected from the group consisting of a low molecular alkyl, alkenyl, α-hydroxyalkyl and an α-oxo-alkyl radical, and 2–10% by weight of a soya-lecithin preparation consisting essentially of chemical lecithin as a predominating ingredient, and a low content of inositol phosphatides and oil.

2. An anesthetic aqueous emulsion for intravenous application characterised by a content of 2–10% by weight of a compound of the formula

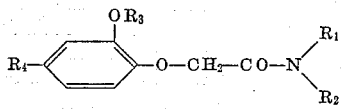

wherein $R_1$, $R_2$ and $R_3$ are low molecular alkyl radicals and $R_4$ is a member selected from the group consisting of low molecular alkyl, alkenyl, α-hydroxyalkyl and α-oxo-alkyl, and 2–10% by weight of a soya-lecithin preparation having a low content of inositol phosphatides and oil, said content of inositol phosphatides and oil being less than about 10% by weight, based on the soya-lecithin content of said preparation; and glucose as an additive to attain isotonia with human blood.

3. An anesthetic aqueous emulsion for intravenous application characterised by a content of 2–10% by weight of a compound of the formula

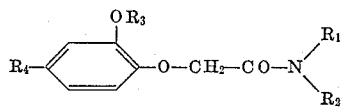

wherein $R_1$, $R_2$ and $R_3$ are low molecular alkyl radicals and $R_4$ is a member selected from the group consisting of low molecular alkyl, alkenyl, α-hydroxyalkyl and α-oxo-alkyl, and 2–10% by weight of the lecithin preparation having substantially the following constitution:

| | Percent by weight |
|---|---|
| Chemical lecithin | 60 |
| Chemical cephalin | 30 |
| Inositol phosphatides | 2.2 |
| Soya bean oil | 4.0 |
| Inert material | 3.8 |

4. An anesthetic aqueous emulsion for intravenous application characterised by a content of substantially 5% by weight of a compound of the formula

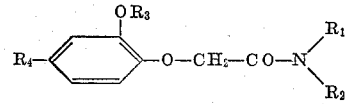

wherein $R_1$, $R_2$ and $R_3$ are low molecular alkyl radicals and $R_4$ is a member selected from the group consisting of low molecular alkyl, alkenyl, α-hydroxyalkyl and α-oxo-alkyl, substantially 4% by weight of the lecithin preparation having substantially the following constitution:

| | Percent by weight |
|---|---|
| Chemical lecithin | 60% |
| Chemical cephalin | 30 |
| Inositol phosphatides | 2.2 |
| Soya bean oil | 4.0 |
| Inert material | 3.8 | and substantially 5% by weight of glucose.

5. An anesthetic aqueous emulsion for intravenous application characterised by a content of 2–10% by weight of 2-methoxy-4-allyl phenoxy acetic acid diethylamide, and 2–10% by weight of a soya-lecithin preparation consisting essentially of chemical lecithin as a predominating ingredient and a low content of inositol phosphatides and oil.

6. An anesthetic aqueous emulsion for intravenous application characterised by a content of 2–10% by weight of 2-methoxy-4-allyl phenoxy acetic acid diethylamide, and 2–10% by weight of a soya-lecithin preparation having a low content of inositol phosphatides and oil; and an auxiliary emulsifier selected from the group consisting of partial glycerides of higher fatty acids, polyoxyethylene derivatives of said partial glycerides, and mixtures thereof.

7. An anesthetic aqueous emulsion for intravenous application characterised by a content of 2–10% by weight of 2-methoxy-4-allyl phenoxy acetic acid diethylamide, and 2–10% by weight of the lecithin preparation having substantially the following constitution:

| | Percent by weight |
|---|---|
| Chemical lecithin | 60 |
| Chemical cephalin | 30 |
| Inositol phosphatides | 2.2 |
| Soya bean oil | 4.0 |
| Inert material | 3.8 |

8. An anesthetic aqueous emulsion for intravenous application characterised by a content of substantially 5% by weight of 2-methoxy-4-allyl phenoxy acetic acid diethylamide, substantially 4% by weight of the lecithin preparation having substantially the following constitution:

| | Percent by weight |
|---|---|
| Chemical lecithin | 60 |
| Chemical cephalin | 30 |
| Inositol phosphatides | 2.2 |
| Soya bean oil | 4.0 |
| Inert material | 3.8 | and substantially 5% by weight of glucose.

9. An anesthetic aqueous emulsion for intravenous application characterised by a content of 5% by weight of 2-methoxy-4-allyl phenoxy acetic acid diethylamide, 2% by weight of soya-lecithin having a low content of inositol phosphatides, 2% by weight of polyoxyethyleneated olein, 0.1% by weight of polyoxyethyleneated sorbitan monolaurate and 5% by weight of glucose.

10. An anesthetic aqueous emulsion for intravenous application characterised by a content of 5% by weight of 2-methoxy-4-allyl phenoxy acetic acid diethylamide, 2% by weight of lecithin having the following constitution:

| | Percent by weight |
|---|---|
| Chemical lecithin | 60 |
| Chemical cephalin | 30 |
| Inositol phosphatides | 2.2 |
| Soya bean oil | 4.0 |
| Inert material | 3.8 |

1% by weight of polyoxyethyleneated palmitostearin, 1% by weight of diolein and 5% by weight of glucose.

11. Method of producing anesthesia which comprises intravenously injecting an aqueous emulsion of 2–10% by weight of a compound of the general formula

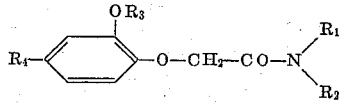

wherein $R_1$, $R_2$ and $R_3$ are low molecular alkyl radicals and $R_4$ is a member selected from the group consisting of low molecular alkyl, alkenyl, α-hydroxy-alkyl and α-oxoalkyl, and 2–10% by weight of a soya-lecithin preparation consisting essentially of chemical lecithin as a predominating ingredient and a low content of inositol phosphatides and oil in a dosage sufficient to produce anesthesia for a period of about 3 to 4 minutes.

12. In the production of anesthetia by means of anesthetically active compounds of the formula

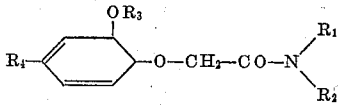

wherein $R_1$, $R_2$ and $R_3$ are low molecular alkyl radicals and $R_4$ is a member selected from the group consisting of low molecular alkyl, alkenyl, α-hydroxy-alkyl and α-oxoalkyl, the improvement consisting of administering the said anesthetic by intravenous injection as an ingredient of an aqueous emulsion containing 2 to 10% by weight of the said compound, and 2 to 10% by weight of a soya-lecithin preparation having substantially the following constitution

| | Percent by weight |
|---|---|
| Chemical lecithin | 60 |
| Chemical cephalin | 30 |
| Inosital phosphatides | 2.2 |
| Soya bean oil | 4.0 |
| Inert material | 3.8 | and also containing glucose as an additive to attain isotonia with human blood.

References Cited in the file of this patent
UNITED STATES PATENTS

| TM. 692,258 | | Feb. 2, 1960 |
| 2,055,083 | Klein et al. | Sept. 22, 1936 |
| 2,138,546 | High | Nov. 29, 1938 |
| 2,734,844 | Ziegler | Feb. 14, 1956 |
| 2,819,199 | Kalish | Jan. 7, 1958 |
| 2,897,120 | Cronin et al. | July 28, 1959 |
| 2,911,440 | Thuillier et al. | Nov. 3, 1959 |
| 2,945,869 | Meyer | July 19, 1960 |
| 2,948,754 | Litvan | Aug. 9, 1960 |
| 2,977,283 | Meyer | Mar. 28, 1961 |

FOREIGN PATENTS

| 669,709 | Great Britain | Apr. 9, 1952 |